(12) United States Patent
Mitani

(10) Patent No.: US 12,252,084 B2
(45) Date of Patent: Mar. 18, 2025

(54) TEMPERATURE MANAGEMENT SYSTEM WITH WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kenichi Mitani, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 182 days.

(21) Appl. No.: 17/613,880

(22) PCT Filed: Mar. 17, 2020

(86) PCT No.: PCT/JP2020/011742
§ 371 (c)(1),
(2) Date: Nov. 23, 2021

(87) PCT Pub. No.: WO2020/246109
PCT Pub. Date: Dec. 10, 2020

(65) Prior Publication Data
US 2022/0234530 A1 Jul. 28, 2022

(30) Foreign Application Priority Data
Jun. 5, 2019 (JP) .................................. 2019-105154

(51) Int. Cl.
*F16L 3/00* (2006.01)
*B60R 16/02* (2006.01)
(Continued)

(52) U.S. Cl.
CPC .......... *B60R 16/08* (2013.01); *B60R 16/0215* (2013.01); *F16L 3/12* (2013.01);
(Continued)

(58) Field of Classification Search
None
See application file for complete search history.

(56) References Cited

U.S. PATENT DOCUMENTS

| | | | | |
|---|---|---|---|---|
| 3,363,864 A | * | 1/1968 | Olgreen | F16L 3/223 248/912 |
| 5,067,677 A | * | 11/1991 | Miceli | H02G 3/26 D8/356 |

(Continued)

FOREIGN PATENT DOCUMENTS

| | | |
|---|---|---|
| JP | 2007-211851 A | 8/2007 |
| JP | 2008-199850 A | 8/2008 |

OTHER PUBLICATIONS

International Search Report issued on Jun. 2, 2020 for WO 2020/246109 A1 (4 pages).

*Primary Examiner* — Steven M Marsh
(74) *Attorney, Agent, or Firm* — Venjuris, P.C.

(57) ABSTRACT

An object of the present disclosure is to enable a wire and a refrigerant pipe to be mounted in a compact form in a vehicle. A temperature management system with a wire includes a refrigerant pipe through which a refrigerant for performing heat exchange in a heat exchange target device that is mounted in a vehicle passes and at a wire at least a portion of which extends along at least a portion of the refrigerant pipe.

7 Claims, 4 Drawing Sheets

(51) Int. Cl.
　　*B60R 16/08*　　　　(2006.01)
　　*F16L 3/12*　　　　(2006.01)
　　*H02G 3/04*　　　　(2006.01)
　　*B60H 1/00*　　　　(2006.01)
　　*B60L 58/24*　　　　(2019.01)

(52) U.S. Cl.
　　CPC ....... *H02G 3/0462* (2013.01); *B60H 1/00271* (2013.01); *B60H 2001/00307* (2013.01); *B60L 58/24* (2019.02)

(56) References Cited

U.S. PATENT DOCUMENTS

| | | | | |
|---|---|---|---|---|
| 5,538,210 | A * | 7/1996 | Ohmori | F16L 3/13 248/222.12 |
| 7,131,170 | B2 * | 11/2006 | Weaver | A46B 17/02 248/316.7 |
| 8,272,613 | B2 * | 9/2012 | Golle | F16B 5/0657 248/74.1 |
| 2015/0217654 | A1 * | 8/2015 | Woo | B60L 53/18 320/109 |
| 2019/0111866 | A1 | 4/2019 | Ito et al. | |
| 2019/0199075 | A1 * | 6/2019 | Sugimura | H01B 9/006 |
| 2023/0228347 | A1 * | 7/2023 | Wouters | H02G 3/32 248/74.2 |

* cited by examiner

US 12,252,084 B2

TEMPERATURE MANAGEMENT SYSTEM WITH WIRE

CROSS REFERENCE TO RELATED APPLICATIONS

This application is a national phase of PCT application No. PCT/JP2020/011742, filed on 17 Mar. 2020, which claims priority from Japanese patent application No. 2019-105154, filed on 5 Jun. 2019, all of which are incorporated herein by reference.

TECHNICAL FIELD

The present disclosure relates to a temperature management system with a wire.

BACKGROUND

Patent Document 1 discloses a technique for routing and wrapping a hose on the outer circumference of a wire harness in a spiral manner. A hose for washer liquid is envisaged as the hose.

PRIOR ART DOCUMENT

Patent Document

Patent Document 1: JP 2007-211851 A

SUMMARY OF THE INVENTION

Problems to be Solved

Meanwhile, recent years has seen an increase in the number of high-voltage circuits in a battery electric vehicle (BEV), a plug-in hybrid electric vehicle (PHEV), or the like. In addition, as a result, a cooling hose is mounted in the vehicle in order to manage the temperatures of the high-voltage devices and the like. In most cases, a wire that is disposed around high-voltage devices has a large diameter in order to apply a high voltage. The cooling hose also has a large diameter in most cases in order to manage the temperature of the high-voltage devices and the like. Therefore, the vehicle space is suppressed by the wire and the cooling hose that are disposed around the high-voltage devices.

Therefore, it is desirable that a wire and a refrigerant pipe can be mounted in a compact form in a vehicle.

Therefore, an object of the present disclosure is to enable a wire and a refrigerant pipe to be mounted in a compact form in a vehicle.

Means to Solve the Problem

A temperature management system with a wire according to the present disclosure includes a refrigerant pipe through which a refrigerant for performing heat exchange in a heat exchange target device that is mounted in a vehicle passes and a wire at least a portion of which extends along at least a portion of the refrigerant pipe.

Effect of the Invention

According to the present disclosure, a wire and a refrigerant pipe are mounted in a compact form in a vehicle.

DETAILED DESCRIPTION TO EXECUTE THE INVENTION

Figure 1:
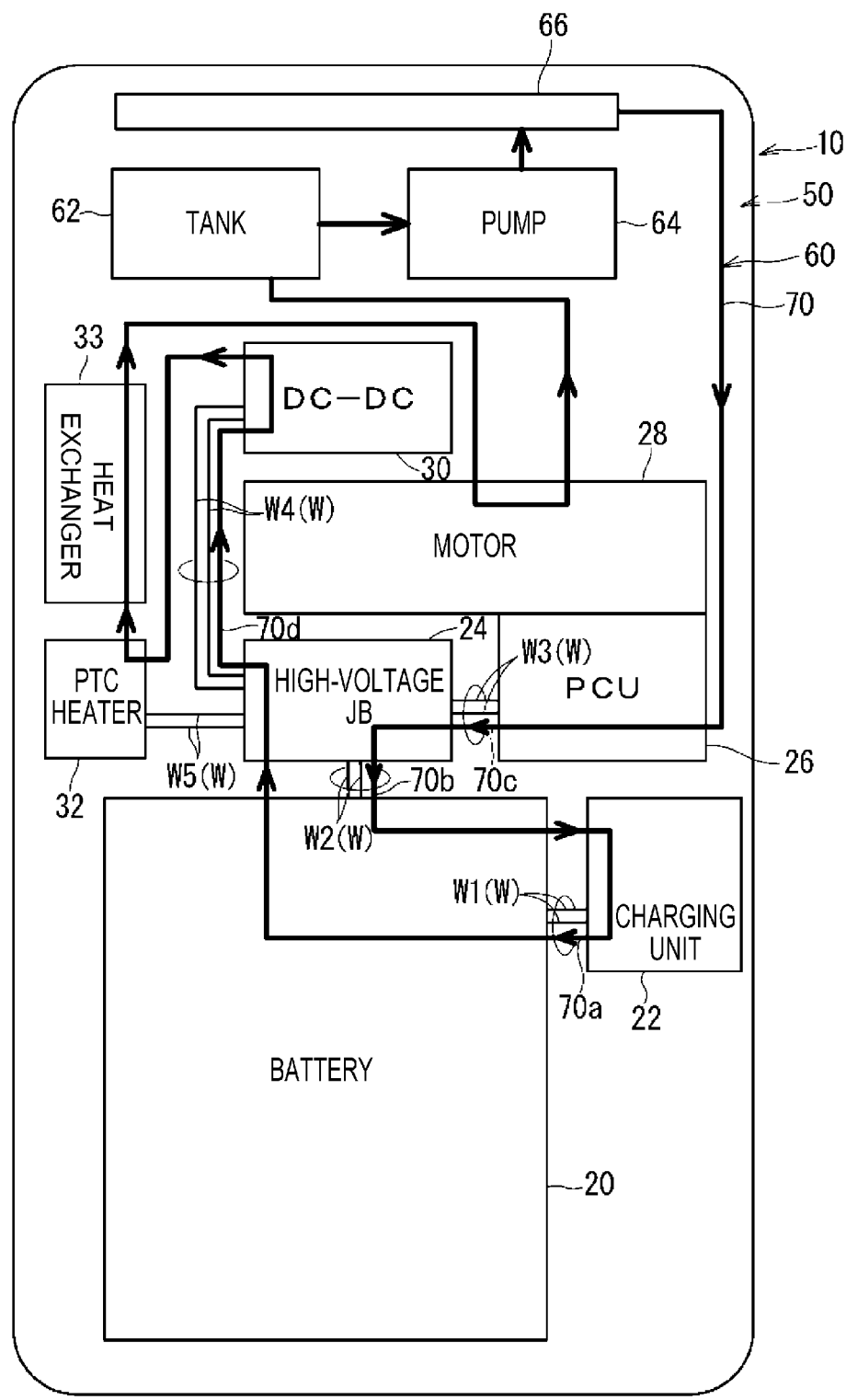
FIG. 1 is a diagram illustrating a temperature management system with a wire according to an embodiment of the present invention.

Description of Embodiments of the Present Disclosure

First, aspects of the present disclosure will be listed and described.

A temperature management system with a wire according to the present disclosure is as follows.

(1) A temperature management system with a wire that includes: a refrigerant pipe through which a refrigerant for performing heat exchange in a heat exchange target device that is mounted in a vehicle passes; and a wire at least a portion of which extends along at least a portion of the refrigerant pipe. In this case, at least a portion of the wire extends along at least a portion of the refrigerant pipe. Therefore, the wire and the refrigerant pipe are mounted in a compact form in a vehicle.

(2) The wire may be connected to the heat exchange target device. In this case, the wire is to be connected to the heat exchange target device whose temperature is managed using a refrigerant that passes through the refrigerant pipe. Therefore, a form in which at least a portion of the wire extends along at least a portion of the refrigerant pipe is made more compact.

(3) In the temperature management system with a wire, the wire may include a high-voltage wire. This allows the high-voltage wire to be effectively cooled by the refrigerant pipe.

(4) The temperature management system with a wire may include a refrigerant circuit that is routed through two or more of a heater, a high-voltage electric device, and a battery, and the refrigerant circuit may include the refrigerant pipe. Accordingly, the refrigerant circuit is routed through two or more of the heater, the high-voltage electric device, and the battery, and thus it is possible to reduce the number of components that constitute the refrigerant circuit. By disposing the wire along the refrigerant pipe that constitutes such a refrigerant circuit, the wire and the refrigerant pipe are mounted in a compact form in a vehicle.

(5) A wire holding portion that holds the wire may be formed integrally as one piece with the refrigerant pipe. Accordingly, the wire is held along the refrigerant pipe by the wire holding portion formed integrally as one piece with the refrigerant pipe.

(6) The temperature management system with a wire may further include an attachment member that includes a pipe attachment portion that is attached to the refrigerant pipe and a wire attachment portion that is attached to the wire. Accordingly, the wire is easily attached to the refrigerant pipe using the attachment member.

(7) The attachment member may include a vehicle fixing portion that is to be fixed to a vehicle. Accordingly, the wire and the refrigerant pipe are fixed to the vehicle using the attachment member.

(8) The temperature management system with a wire may further include a binding member that is wrapped around the wire and the refrigerant pipe. Accordingly, the wire is kept in a state of extending along the refrigerant pipe using the binding member.

Details of Embodiments of the Present Disclosure

Specific examples of a temperature management system with a wire according to the present disclosure will be described below with reference to the drawings. It should be noted that the present invention is not limited to these examples, but is defined by the claims, and is intended to include all modifications which fall within the scope of the claims and the meaning and scope of equivalents thereof.

First Embodiment

A temperature management system with a wire according to the first embodiment will be described below. FIG. 1 is a diagram illustrating a temperature management system 50 with a wire incorporated in a vehicle 10.

In the present embodiment, a vehicle 10 is a battery electric vehicle (BEV). Here, a BEV is a vehicle that includes a battery charged by an external power supply and travels using the energy stored in the battery. Here, a BEV means a vehicle that travels using only the energy stored in the battery as the power source.

This temperature management system 50 with a wire is suitable to be applied to not only a BEV but also a vehicle that travels in response to the driving of an electric motor. A high-voltage electric device is mounted in such a vehicle in order to drive the electric motor. The temperature management system 50 with a wire is effective at cooling such a high-voltage electric device and a high-voltage wire for supplying power to the high-voltage electric device. A hybrid electric vehicle (HEV), a plug-in hybrid electric vehicle (PHEV), a fuel cell vehicle (FCV), and so forth are envisaged as the vehicle that travels in response to the driving of the electric motor.

Heat Exchange Target Device

An example of a heat exchange target device that is mounted in the vehicle 10 will be described. Here, a battery 20 and a charging unit 22 are mounted in the vehicle 10.

The battery 20 stores power energy for the vehicle to travel. A nickel battery, a lithium-ion battery, or the like is used as the battery 20. The battery 20 generates heat during charging and discharging. When the temperature of the battery 20 increases excessively, the charging/discharging properties decrease. In order to suppress an excessive increase in the temperature of the battery 20, it is desirable for the battery 20 to be cooled. Note that the voltage supplied from the battery 20 is, for example, 400 to 800 V.

The charging unit 22 is connected to the battery 20. The charging unit 22 is a unit that is supplied with power from the outside, and controls the charging of the battery 20. The charging unit 22 is supplied with power of 100 to 1000 V, for example, from the outside, and controls the charging of the battery 20. The charging unit 22 is also a unit that is likely to generate heat, and it is desirable for the charging unit 22 to be cooled. The charging unit 22 is an example of a high-voltage electric device, and is an example of a heat exchange target device.

Note that a high voltage refers to a voltage greater than 60 V, for example. Accordingly, a high-voltage electric device is an electric device to which a voltage greater than, for example, 60 V is applied. In addition, a heat exchange target device refers to a device that is to be subjected to heat exchange performed using a refrigerant that passes through a refrigerant pipe to be described later.

A high-voltage junction box (JB) 24, a power control unit (PCU) 26, a motor 28, a DC/DC converter 30, and the like are mounted in the vehicle 10.

The high-voltage JB 24 is connected to the battery 20. The high-voltage JB 24 divides power supplied from the battery 20 into a plurality of parts, and supplies them to a plurality of electric devices.

The PCU 26 and the DC/DC converter 30 are connected to the high-voltage JB 24.

The PCU 26 is a unit that controls the power between the battery 20 and the motor 28. The PCU 26 includes a DC/DC converter that boosts the voltage of the battery 20, a DC/AC converter for driving the motor 28, and so forth. After being boosted by the DC/DC converter, the power from the battery 20 is then converted into a 3-phase AC by the DC/AC converter, and is supplied to the motor 28.

The DC/DC converter 30 lowers the voltage of the battery 20. Various electric devices of the vehicle are connected to the DC/DC converter 30. As the electric devices, an electronic control unit (ECU), an actuator, a display device, a light-emitting diode, a lamp, an entertainment device, and so forth are envisaged The high-voltage JB 24, the PCU 26, and the DC/DC converter 30 are also units that are likely to generate heat, and it is desirable for the high-voltage JB 24, the PCU 26, and the DC/DC converter 30 to be cooled. The high-voltage JB 24, the PCU 26, and the DC/DC converter 30 that have been described above are examples of a high-voltage electric device to which a voltage supplied from the battery 20 is applied. In addition, the high-voltage JB 24, the PCU 26, the DC/DC converter 30 are examples of a heat exchange target device.

The motor 28 is also a unit that is likely to generate heat, and it is desirable for the motor 28 to be cooled. The motor 28 is an example of a high-voltage electric device. The motor 28 is also an example of a heat exchange target device.

In addition, a positive temperature coefficient (PTC) heater 32 is mounted in the vehicle 10. The PTC heater 32 is connected to the high-voltage JB 24, and can generate heat as a result of being supplied with power from the battery 20. Here, in gasoline automobiles and diesel automobiles, heating can be performed by an air conditioner unit using waste heat resulting from fuel combustion. In contrast, if the vehicle 10 is a BEV, it is not possible to use waste heat resulting from fuel combustion. In view of this, also in a BEV, heating can be performed by the air conditioner unit by using the PTC heater 32. The PTC heater may also be used as a heater that warms the battery 20 under cold conditions and the like.

The PTC heater 32 is an example of a high-voltage electric device that is driven by a high voltage. In addition, the PTC heater 32 is also an example of a heat exchange target device in which a refrigerant that passes through a later-described refrigerant pipe is heated.

In the present example, the battery 20 and the charging unit 22 are connected by a wire W1. The battery 20 and the high-voltage JB 24 are connected by a wire W2. The high-voltage JB 24 and the PCU 26 are connected by a wire W3. The high-voltage JB 24 and the DC/DC converter 30 are connected by a wire W4. The high-voltage JB 24 and the PTC heater 32 are connected by a wire W5. The wires W1 to W5 are examples of a wire that is connected to heat exchange target devices. In addition, the wires W1 to W5 are examples of a high-voltage wire. Here, the high-voltage wire refers to a wire to which a voltage greater than, for example, 60 V is applied.

Refrigerant Circuit

An example of a refrigerant circuit 60 that is incorporated in the above vehicle 10 will be described.

The refrigerant circuit 60 is a circuit through which a refrigerant is to be passed, and is configured to be routed through two or more of the PTC heater 32, high-voltage electric devices 22, 24, 26, 28, and 30, and the battery 20.

In the present embodiment, the refrigerant circuit 60 is configured to be routed through all of the PTC heater 32, the high-voltage electric devices 22, 24, 26, 28, and 30, and the battery 20.

More specifically, the refrigerant circuit 60 includes a tank 62, a pump 64, a radiator 66, and the refrigerant pipe 70.

The tank 62 is a tank that stores a refrigerant. The pump 64 is a pump that delivers the refrigerant so as to pass through devices via the refrigerant pipe 70. The radiator 66 is an apparatus that radiates the heat from the refrigerant.

The refrigerant pipe 70 is a pipe made of a resin or metal through which a refrigerant for performing heat exchange in the heat exchange target devices that are mounted in a vehicle passes. The refrigerant pipe 70 is connected to link the above devices. Here, as an example, the refrigerant pipe 70 constitutes a refrigerant circuit that starts from the tank 62, passes through the pump 64, the radiator 66, the PCU 26, the high-voltage JB 24, the battery 20, the charging unit 22, the battery 20, the high-voltage JB 24, the DC/DC converter 30, the PTC heater 32, a heat exchanger 33, and the motor 28, and returns to the tank 62. In the radiator 66, the PCU 26, the high-voltage JB 24, the battery 20, the charging unit 22, the battery 20, the high-voltage JB 24, the DC/DC converter 30, the PTC heater 32, the heat exchanger 33, and the motor 28, a pipe dedicated to heat exchange may be provided. In this case, the refrigerant pipe 70 is connected to these pipes provided in the devices. Alternatively, the refrigerant pipe 70 may directly pass through the devices and perform heat exchange. The order in which the refrigerant circuit passes through the devices is not limited to the above example. The order in which the refrigerant circuit passes through the devices may be determined as appropriate, taking into account the degrees of heat generation, the working temperature ranges, and the like of the devices.

The refrigerant stored in the tank 62 is then sent to the radiator 66 by the pump 64. The refrigerant is cooled by the radiator 66. The cooled refrigerant is sent to the PCU 26, the high-voltage JB 24, the battery 20, the charging unit 22, the battery 20, the high-voltage JB 24, and the DC/DC converter 30 through the refrigerant pipe 70, and cools those devices. After that, the refrigerant is heated by the PTC heater 32, and is then sent to the heat exchanger 33. In the heat exchanger 33, air for warming the passenger compartment of the vehicle is heated, and the refrigerant is cooled. The refrigerant then passes through the motor 28, and cools the motor 28. The refrigerant then returns to the tank 62.

That is to say, in the present embodiment, the refrigerant circuit that constitutes a PTC heater system that includes the PTC heater 32, a temperature control system that cools the high-voltage electric devices, and a temperature control system of the battery 20 is configured as one circuit. The refrigerant circuit being configured as one circuit refers to the refrigerant circuit being configured such that the refrigerant can pass through the devices targeted for heat exchange, for example. In this case, one or more tanks may be used. Also, one or more pumps may be used. In addition, a configuration may also be adopted in which the refrigerant circuit splits halfway, and joins at another portion.

The wires W1 to W4 extend respectively along refrigerant pipes 70a, 70b, 70c, and 70d of the refrigerant pipe 70. Here, the refrigerant pipe 70a connects the battery 20 and the charging unit 22. The refrigerant pipe 70b connects the battery 20 and the high-voltage JB 24. The refrigerant pipe 70c connects the high-voltage JB 24 and the PCU 26. The refrigerant pipe 70d connects the high-voltage JB 24 and the DC/DC converter 30.

A configuration for disposing the wires W1 to W4 respectively along the refrigerant pipes 70a, 70b, 70c, and 70d will be described later.

The temperature management system 50 with a wire according to the present embodiment includes the above refrigerant pipe 70 and the wires W1 to W4.

Here, the wires W1 to W4 extend along the refrigerant pipes 70a, 70b, 70c, and 70d of the above refrigerant pipe 70.

The wires W1 to W4 connect devices, and the refrigerant pipes 70a, 70b, 70c, and 70d also connect between devices. Therefore, it is easy to incorporate the refrigerant pipes 70a, 70b, 70c, and 70d and the wires W1 to W4 that extent respectively along the refrigerant pipes 70a, 70b, 70c, and 70d into the vehicle at the same time. If the wire W1 extends along the refrigerant pipe 70a that connects the battery 20 and the charging unit 22, for example, then the refrigerant pipe 70a and the wire W1 can be easily incorporated between the battery 20 and the charging unit 22 at the same time.

With the temperature management system 50 with a wire configured in this manner, at least some of the wires W, namely the wires W1 to W4 extend along the refrigerant pipes 70a, 70b, 70c, and 70d. Therefore, in the vehicle 10, it is not necessary to separately ensure arrangement spaces of the refrigerant pipes 70a, 70b, 70c, and 70d and arrangement spaces of the wires W1 to W4. It is possible to dispose the refrigerant pipes 70a, 70b, 70c, and 70d and the wires W1 to W4 in shared arrangement spaces. Accordingly, the refrigerant pipes 70a, 70b, 70c, and 70d and the wires W1 to W4 can be mounted in a compact form in the vehicle.

In addition, the wires W1 to W4 are connected to devices whose temperatures are managed using the refrigerant that passes through the refrigerant pipes 70a, 70b, 70c, and 70d, respectively. That is to say, the devices to which the wires W1 to W4 are respectively connected are the same as the devices whose temperatures are managed using the refrigerant that passes through the refrigerant pipes 70a, 70b, 70c, and 70d. Therefore, it is possible to make the form in which the wires W1 to W4 extend along the refrigerant pipes 70a, 70b, 70c, and 70d more compact.

In addition, the refrigerant pipes 70a, 70b, 70c, and 70d are connected to high-voltage electric devices, and the temperatures of the high-voltage electric devices are managed using the refrigerant that passes through the refrigerant pipes 70a, 70b, 70c, and 70d. A high voltage is applied to the high-voltage wires W1 to W4, and thus the high-voltage wires W1 to W4 are likely to generate heat. It is possible to effectively cool the high-voltage wires W1 to W4 that are connected to the high-voltage electric devices, using the refrigerant pipes 70a, 70b, 70c, and 70d.

In addition, the refrigerant circuit 60 is routed through two or more of the PTC heater 32, the high-voltage electric devices, and the battery 20, and thus it is possible to reduce the number of components constituting the refrigerant circuit 60. By disposing the wires W1 to W4 along the refrigerant pipes 70a, 70b, 70c, and 70d that constitute the above refrigerant circuit 60, the wires W1 to W4 and the refrigerant pipes 70a, 70b, 70c, and 70d can be mounted in a compact form in the vehicle 10.

Regarding Configuration for Disposing Wires Along Refrigerant Pipes

An exemplary configuration for disposing the wires W1 to W4 along the refrigerant pipes 70a, 70b, 70c, and 70d and holding the wires will be described.

Figure 2:
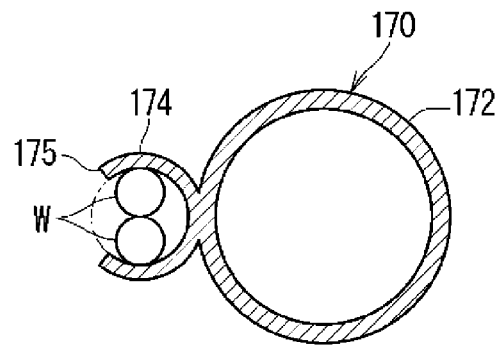
FIG. 2 is a schematic cross-sectional view showing a refrigerant pipe and wires.

FIG. 2 is a schematic cross-sectional view showing a first exemplary configuration for disposing wires W along a refrigerant pipe 170. The refrigerant pipe 170 is an example of a pipe that is applicable to the refrigerant pipes 70a, 70b, 70c, and 70d. Hereinafter, the wires W1 to W4 may be referred to as "wires W" without distinguishing them.

The refrigerant pipe 170 has a configuration in which a pipe body portion 172 and a wire holding portion 174 are formed integrally as one piece. The refrigerant pipe 170 is formed, for example, by extrusion molding a resin.

The pipe body portion 172 is formed in a tubular shape that allows a refrigerant to pass therethrough.

Each wire W includes a core wire, and an insulating coating surrounding the core wire. The core wire may be a solid wire, or may be a stranded wire. The insulating coating is formed, for example, by subjecting the core wire to extrusion coating. Here, the transverse cross-sectional shape (the shape of a cross section orthogonal to the axial direction) of the wire W is a circular shape. The transverse cross-sectional shape of the wire W may be a square shape, a rectangular shape, or the like. Here, an example is shown in which two wires W are held along the refrigerant pipe 170. The number of wires W may be one, or may be three. In the following, the smallest circle that is in contact with the outer circumference of one or more wires W may be referred to as a circumscribed circle.

The wire holding portion 174 is formed so as to protrude outward from a portion of the outer circumference of the pipe body portion 172. The wire holding portion 174 is formed in a tubular shape having a slit 175 formed in a portion of the outer circumference thereof. The inner diameter of the wire holding portion 174 is set to be a size large enough to house the wires W therein. For example, the inner diameter of the wire holding portion 174 is set to be about the same as the diameter of the circumscribed circle of the wires W. The width of the slit 175 is set to be a size large enough to house the wires W in the wire holding portion 174 using the elastic deformation of the wire holding portion 174, and to prevent the wires W from falling out of the wire holding portion 174 in a state in which the wires W are housed in the wire holding portion 174. For example, the width of the slit 175 is set to be smaller than the diameter of the circumscribed circle of the wires W, and larger than the radius thereof. Here, the slit 175 is open to the side opposite to the pipe body portion 172. The position at which the slit 175 is open may be another position.

As a result of the slit 175 being opened through elastic deformation of the wire holding portion 174, the wires W are housed in the wire holding portion 174. In a state in which the wires W are housed in the wire holding portion 174, the wire holding portion 174 is elastically restored to its original shape. Then, the slit 175 is closed, whereby the wires W are held by the wire holding portion 174. This allows the wires W to be kept held along the refrigerant pipe 170.

Figure 3:
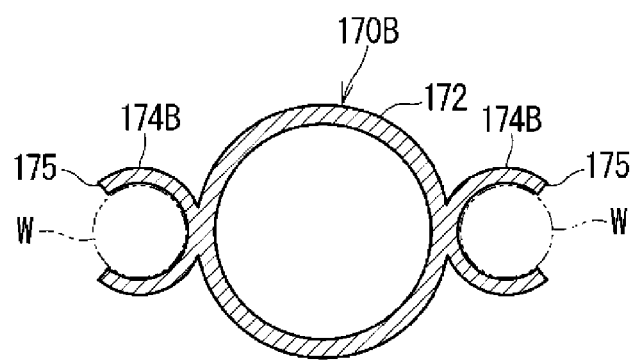
FIG. 3 is a schematic cross-sectional view showing a refrigerant pipe and wires according to another example.

FIG. 3 is a schematic diagram showing a modification of the refrigerant pipe 170 shown in FIG. 2. A refrigerant pipe 170B according to this modification includes a pipe body portion 172, and a plurality of (here, two) wire holding portions 174B.

The pipe body portion 172 and the plurality of wire holding portions 174B are molded as a single piece using a resin or the like. Here, the two wire holding portions 174B are provided on opposite sides of the pipe body portion 172. The plurality of wire holding portions may be provided adjacent to each other on the outer circumferential side of the pipe body portion.

The wire holding portions 174B are each configured in the same manner as the wire holding portion 174 described above. The wire holding portions 174B are each formed in a size large enough to hold a wire W that is to be held therein. The width of each slit 175 is set to be a size large enough to house the wire W in each wire holding portion 174B using elastic deformation of the wire holding portion 174B, and to prevent the wire W from falling out.

According to the example shown in FIG. 2 or 3, the wires W can be easily attached along the refrigerant pipe 170 or 170B.

Since the refrigerant pipe 170 or 170B and the wires W are supplied in an integrated form, the ease of attachment to the vehicle 10 is increased. It is also possible that the refrigerant pipe 170 or 170B and the wires W are provided in separate forms, and they are integrated with each other when attached to the vehicle 10. This allows the attachment operation to be performed in a flexible manner.

Since the wires W are attached close to the refrigerant pipe 170 or 170B, the effect of cooling the wire W is increased.

In particular, in the example show in FIG. 3, a plurality of (here, two) wires W are held in one-to-one correspondence by a plurality of (here, two) wire holding portions 174B. Accordingly, the wires W are held close to the pipe body portion 172, and the wires W are effectively cooled.

Figure 4:
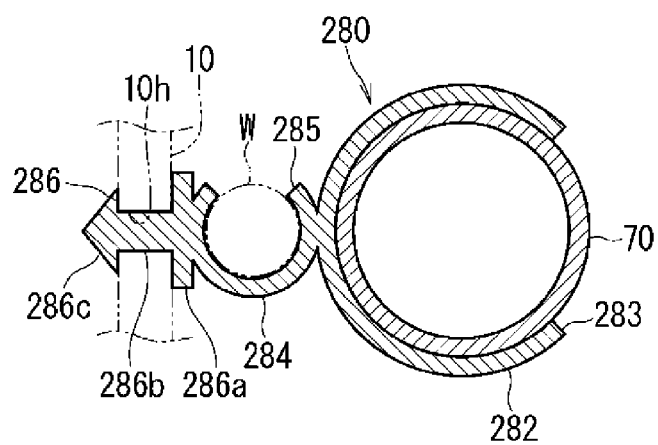
FIG. 4 is a schematic cross-sectional view showing a refrigerant pipe and a wire according to another example.

FIG. 4 is a schematic cross-sectional view showing a second exemplary configuration for disposing the wire W along a refrigerant pipe 70. Hereinafter, the refrigerant pipes 70a, 70b, 70c, and 70d may be referred to as "refrigerant pipes 70" without distinguishing them.

In the present example, the wire W is held along the refrigerant pipe 70 by an attachment member 280.

The attachment member 280 includes a pipe attachment portion 282 and a wire attachment portion 284. The attachment member 280 is made of a resin or the like.

The pipe attachment portion 282 is an annular portion having an opening 283 formed in a portion thereof in the circumferential direction, or in other words, is a C-shaped member. The pipe attachment portion 282 is set to have an inner diameter capable of housing the refrigerant pipe 70. The opening 283 is set to be smaller than the diameter of the refrigerant pipe 70. Also, the opening 283 is opened by elastically deforming the pipe attachment portion 282. Through the opened opening 283, the refrigerant pipe 70 is housed in the pipe attachment portion 282. In this state, the pipe attachment portion 282 is elastically restored to its original shape, whereby the pipe attachment portion 282 is attached to the refrigerant pipe 70.

The wire attachment portion 284 is an annular portion having an opening 285 formed in a portion thereof in the circumferential direction, or in other words, is a C-shaped member. The wire attachment portion 284 is set to have an inner diameter capable of housing the wire W. The opening 285 is set to be smaller than the diameter of the circumscribed circle of the wire W. Also, the opening 285 is opened by elastically deforming the wire attachment portion 284. Through the opened opening 285, the wire W is housed in the wire attachment portion 284. In this state, the wire attachment portion 284 is elastically restored to its original shape, whereby the wire attachment portion 284 is attached to the wire W.

The attachment member 280 is a short member that is partially attached to the wire W and the refrigerant pipe 70 in the extension direction thereof. The attachment member 280 may be an elongated member that is attached to the wire W and the refrigerant pipe 70 over a certain length.

Note that the directions of the opening 283 of the pipe attachment portion 282 and the opening 285 of the wire attachment portion 284 may be any directions.

In the present example, the attachment member 280 includes a vehicle fixing portion 286 that is to be fixed to the vehicle. Here, the vehicle fixing portion 286 includes a base portion 286a, a columnar portion 286b, and catch portions 286c. The base portion 286a is formed in a disc shape or a dish shape. The base portion 286a is molded integrally with the wire attachment portion 284 at a position adjacent to a portion of the outer circumference of the wire attachment portion 284. The base portion may be formed integrally with the pipe attachment portion at a position adjacent to a portion of the outer circumference of the pipe attachment portion.

The columnar portion 286b is an oblong columnar portion protruding outward from the center of the base portion 286a.

A pair of catch portions 286c are provided at a distal end portion of the columnar portion 286b. The outward facing surface of each catch portion 286c is formed so as to be inclined outward from the distal end portion to a proximal end portion of the columnar portion 286b.

Also, when the vehicle fixing portion 286 is inserted into a fixing hole 10h formed in the vehicle 10, and the catch portions 286c have moved through the fixing hole 10h, the catch portions 286c are caught on a portion of the vehicle 10 that is located around the fixing hole 10h. Consequently, the portion of the vehicle 10 that is located around the fixing hole 10h is sandwiched between the catch portions 286c and the base portion 286a. Accordingly, the vehicle fixing portion 286 is fixed to the vehicle 10.

The configuration of the vehicle fixing portion 286 is not limited to the above-described example. The vehicle fixing portion may be a portion that is to be fixed to the vehicle through screwing, or a portion that is to be fixed to the vehicle through welding or the like. The vehicle fixing portion 286 may be omitted.

According to the present example, by using the attachment member 280, the wire W can be easily attached to the refrigerant pipe 70.

Since the refrigerant pipe 70 and the wire W are supplied in an integrated form, the ease of attachment to the vehicle 10 is increased. It is also possible that the refrigerant pipe 70 and the wire W are provided in separate forms, and they are integrated with each other using the attachment member 280 when being attached to the vehicle 10. This allows the attachment operation to be performed in a flexible manner.

By fixing the vehicle fixing portion 286 to the vehicle 10, it is possible to fix the wire W and the refrigerant pipe 70 to the vehicle.

Figure 5:
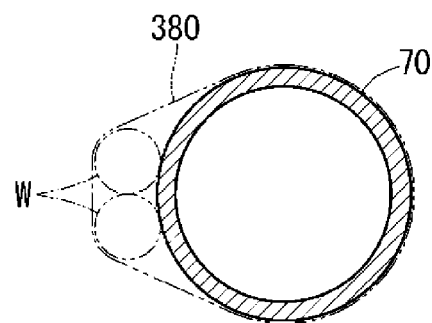
FIG. 5 is a schematic cross-sectional view showing a refrigerant pipe and wires according to another example.

FIG. 5 is a schematic cross-sectional view showing a third exemplary configuration for disposing wires W along the refrigerant pipe 70.

In the present example, the wires W are disposed along the refrigerant pipe 70. A bundling member 380 is wrapped around the wires W and the refrigerant pipe 70. Adhesive tape, a cable tie, or the like is used as the bundling member 380.

Here, components for fixing the wires to the vehicle include a component having an oblong plate-shaped portion molded integrally with its constituent portion as in the case of the vehicle fixing portion 286 described above. The bundling member 380 described above may be wrapped around the wires W and the refrigerant pipe 70 with the plate-shaped portion of this component being bundled together therewith.

According to the present example, the wires W can be easily attached to the refrigerant pipe 70 using the binding member 380.

In addition, since the refrigerant pipe 70 and the wires W are supplied in an integrated form, the ease of attachment to the vehicle 10 is increased. It is also possible that the refrigerant pipe 70 and the wires W are provided in separate forms, and they are integrated with each other using the binding member 380 when attached to the vehicle 10. This allows the attachment operation to be performed in a flexible manner.

In addition, the wires W are bound in a state of being in contact with the refrigerant pipe 70, and thus it is also possible to increase the effect of cooling the wires W.

Modification

In the present embodiment, an example has been described in which the refrigerant circuit 60 is a system that performs heat exchange, and is routed through the PTC heater 32, the high-voltage electric devices 22, 24, 26, 28, and 30, and the battery 20. The refrigerant circuit may also be a heat exchange system that is separately routed through the PTC heater 32, the high-voltage electric devices 22, 24, 26, 28, and 30, and the battery 20. The refrigerant circuit 60 may also be a heat exchange system that is routed through two or more of the PTC heater 32, the high-voltage electric devices 22, 24, 26, 28, and 30, and the battery 20.

Figure 6:
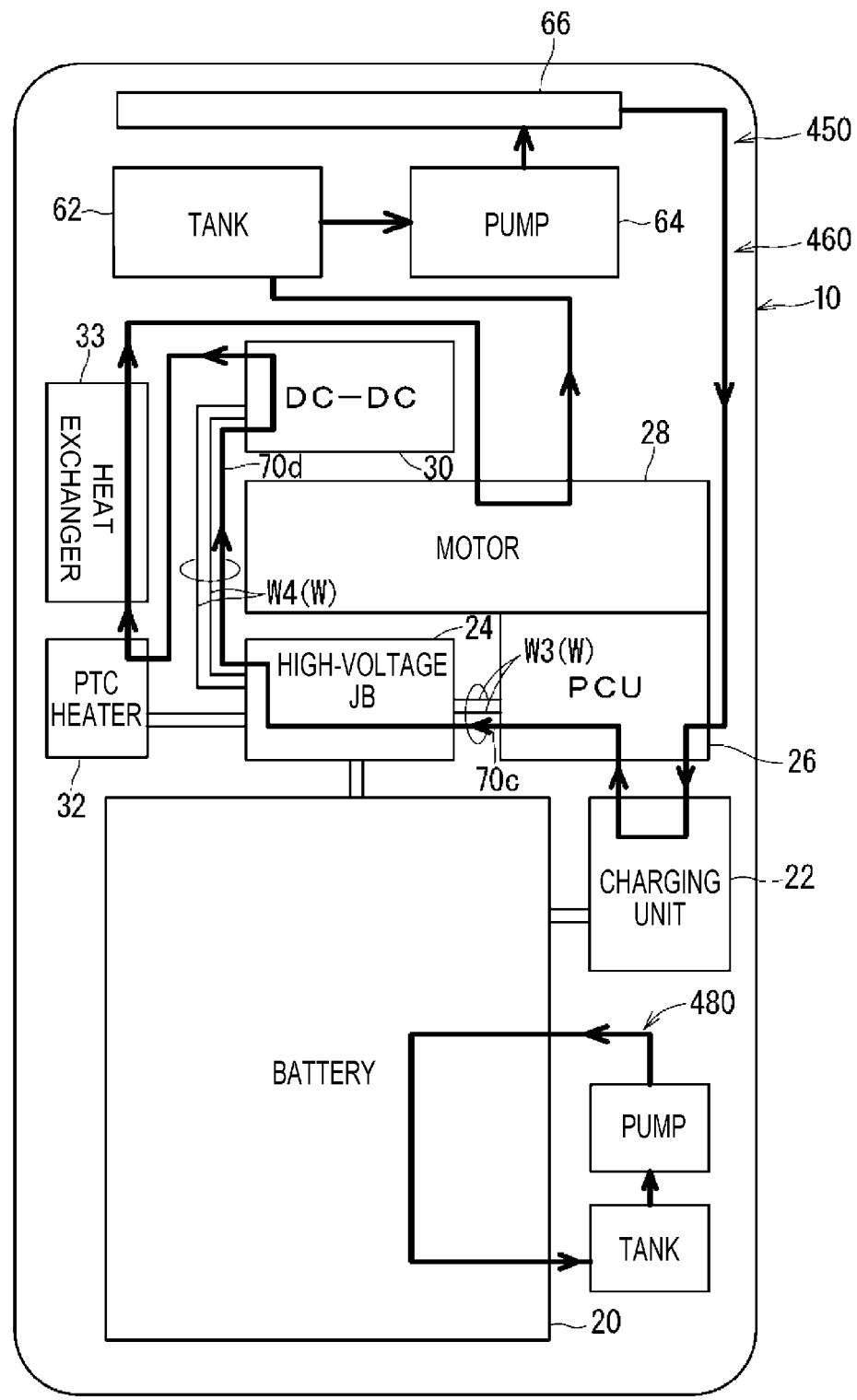
FIG. 6 is a diagram illustrating a temperature management system with a wire according to a modification.

A temperature management system 450 with a wire shown in FIG. 6 includes two refrigerant circuits 460 and 480, for example. The refrigerant circuit 460 is a heat exchange system that is routed through the PTC heater 32 and the high-voltage electric devices 22, 24, 26, 28, and 30. The refrigerant circuit 480 is a system that performs heat exchange, and is routed through the battery 20. The wire W3 that connects the PCU 28 and the high-voltage JB 24 is disposed along the refrigerant pipe 70c of the refrigerant circuit 460 that connects a PCU 28 and the high-voltage JB 24. Also, W4 that connects the high-voltage JB 24 and the DC/DC converter 30 is disposed along the refrigerant pipe 70d of the refrigerant circuit 460 that connects the high-voltage JB 24 and the DC/DC converter 30.

Also according to the present example, except for the operative effects of the refrigerant circuit 60 being routed through the battery 20, it is possible to achieve operative effects similar to those of the above embodiment.

Figure 7:
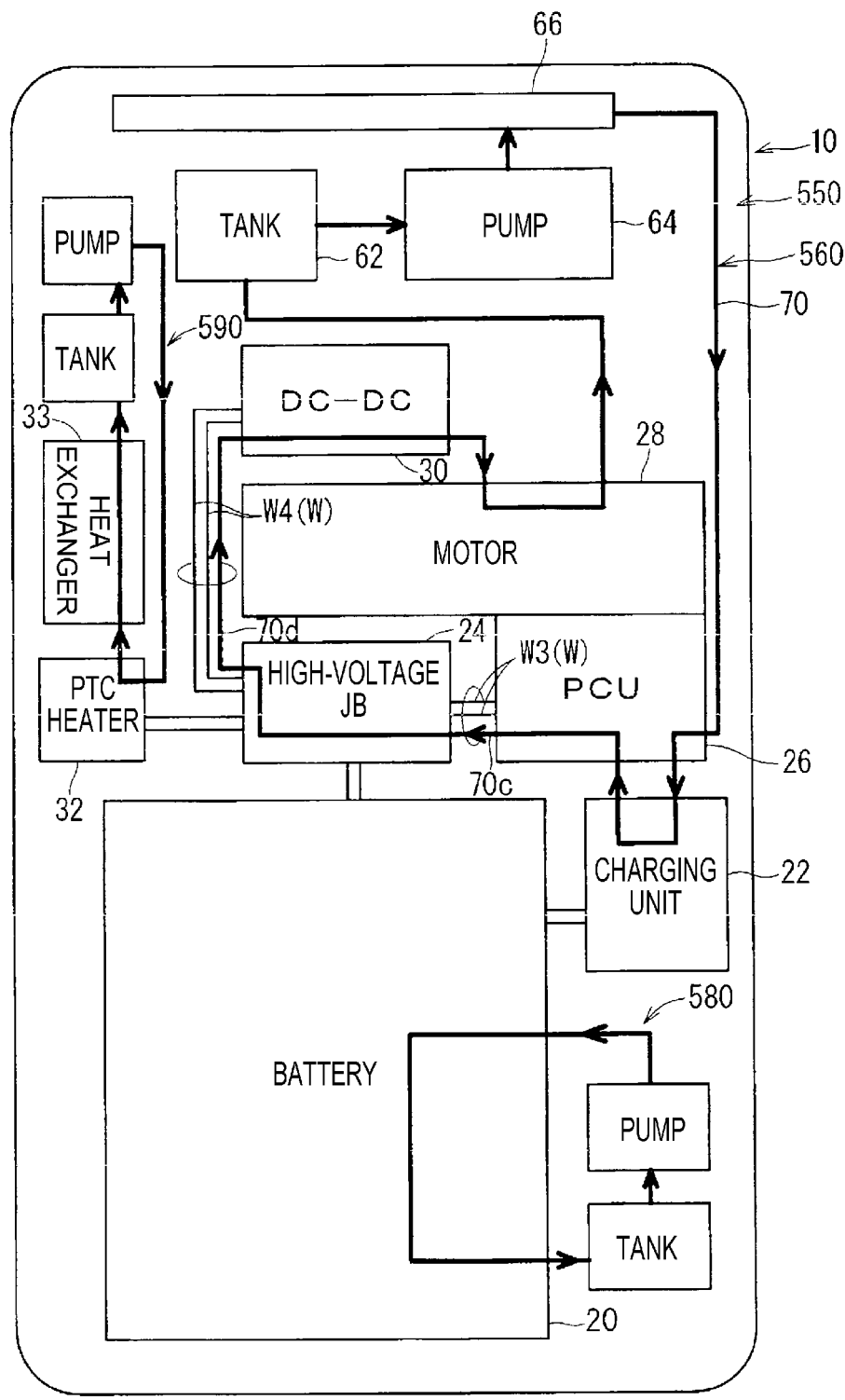
FIG. 7 is a diagram illustrating a temperature management system with a wire according to another modification.

In addition, for example, a temperature management system 550 with a wire shown in g FIG. 7 includes three refrigerant circuits 560, 580, and 590. The refrigerant circuit 560 is a system that performs heat exchange, and is routed through the high-voltage electric devices 22, 24, 26, 28, and 30. The refrigerant circuit 580 is a system that performs heat exchange, and is routed through the battery 20. The refrigerant circuit 590 is a heat exchange system that is routed through the PTC heater 32. The wire W3 that connects the PCU 28 and the high-voltage JB 24 is disposed along the refrigerant pipe 70c of the refrigerant circuit 560 that connects the PCU 28 and the high-voltage JB 24. Also, W4 that connects the high-voltage JB 24 and the DC/DC converter 30 is disposed along the refrigerant pipe 70d of the refrigerant circuit 560 that connects the high-voltage JB 24 and the DC/DC converter 30.

Also according to the present example, except for the operative effects of the refrigerant circuit 60 being routed through the PTC heater 32, the high-voltage electric devices 22, 24, 26, 28, and 30, and the battery 20, it is possible to achieve operative effects similar to those of the above embodiment.

The configurations described in the embodiment and the modification may be combined as appropriate as long as there are no mutual inconsistencies. For example, the configurations respectively shown in FIGS. 2, 3, 4, and 5 above may be used in combination as the configuration for disposing the wire along the refrigerant pipe.

LIST OF REFERENCE NUMERALS

10 Vehicle
10h Fixing hole
20 Battery
22 Charging unit (high-voltage electric device)
24 High-voltage JB (high-voltage electric device)
26 PCU (high-voltage electric device)
28 Motor (high-voltage electric device)
30 DC/DC converter (high-voltage electric device)
32 PTC heater
33 Heat exchanger
50 Temperature management system with wire
60 Refrigerant circuit
62 Tank
64 Pump
66 Radiator
70, 70a, 70b, 70c, 70d, 170, 170B Refrigerant pipe
172 Pipe body portion
174, 174B Wire holding portion
175 Slit
280 Attachment member
282 Pipe attachment portion
283 Opening
284 Wire attachment portion
285 Opening
286 Vehicle fixing portion
286a Base portion
286b Columnar portion
286c Catch portions
380 Binding member
450 Temperature management system with wire
460 Refrigerant circuit
480 Refrigerant circuit
550 Temperature management system with wire
560 Refrigerant circuit
580 Refrigerant circuit
590 Refrigerant circuit
W Wire
W1, W2, W3, W4, W5 Wire (high-voltage wire)

What is claimed is:

1. A temperature management system with a wire, comprising:
    a refrigerant pipe through which a refrigerant for performing heat exchange in a heat exchange target device that is mounted in a vehicle passes; and
    a wire at least a portion of which extends along at least a portion of the refrigerant pipe,
    wherein the refrigerant pipe has a configuration in which a plurality of wire holding portions are arranged around an outer circumference of a pipe body portion forming the refrigerant pipe, each of the plurality of wire holding portions including a wire holding portion that holds the wire, the wire holding portion formed integrally as one piece with the pipe body portion.

2. The temperature management system with a wire according to claim 1, wherein the wire is configured to be applied with a high voltage and electrically connected to each of a plurality of high-voltage electric devices forming the heat exchange target device.

3. The temperature management system with a wire according to claim 1, wherein the wire includes a high-voltage wire for carrying a high voltage of greater than 60V.

4. The temperature management system with a wire according to claim 1, further comprising:
    a refrigerant circuit that is routed through two or more of a positive temperature coefficient heater, a high-voltage electric device, and a battery,
    wherein the refrigerant circuit includes the refrigerant pipe.

5. The temperature management system with a wire according to claim 1, further comprising:
    an attachment member that includes a pipe attachment portion that is attached to the refrigerant pipe and a wire attachment portion that is attached to the wire.

6. The temperature management system with a wire according to claim 5,
    wherein the attachment member includes a vehicle fixing portion that is to be fixed to a vehicle.

7. The temperature management system with a wire according to claim 1, further comprising:
    a binding member that is wrapped around the wire and the refrigerant pipe.

* * * * *